US008773410B2

(12) United States Patent
Huang et al.

(10) Patent No.: US 8,773,410 B2

(45) Date of Patent: Jul. 8, 2014

(54) METHOD FOR DRIVING A DISPLAY AND RELATED DISPLAY APPARATUS

(75) Inventors: Da-Rong Huang, Tainan County (TW); Chien-Ru Chen, Tainan County (TW)

(73) Assignee: Himax Technologies Limited, Fonghua Village, Xinshi Dist., Tainan (TW)

(*) Notice: Subject to any disclaimer, the term of this patent is extended or adjusted under 35 U.S.C. 154(b) by 826 days.

(21) Appl. No.: 12/335,518

(22) Filed: Dec. 15, 2008

(65) Prior Publication Data

US 2010/0149170 A1 Jun. 17, 2010

(51) Int. Cl.

*G09G 3/36* (2006.01)
*G06F 3/038* (2013.01)
*G09G 5/00* (2006.01)

(52) U.S. Cl.

USPC .............................. 345/204; 345/87; 345/214

(58) Field of Classification Search

CPC . G09G 3/3275; G09G 3/3282; G09G 3/3685; G09G 3/3688; G09G 2330/021; G09G 2310/0291; G09G 2310/08

USPC .................... 345/84–104, 204–215, 690–699

See application file for complete search history.

(56) References Cited

U.S. PATENT DOCUMENTS

| | | | | |
|---|---|---|---|---|
| 7,053,660 | B2 * | 5/2006 | Itoh et al. | 326/87 |
| 7,321,246 | B2 * | 1/2008 | Nishimura | 327/112 |
| 7,903,078 | B2 * | 3/2011 | Tsuchi | 345/100 |
| 2003/0112071 | A1 * | 6/2003 | Bu | 330/253 |
| 2004/0051688 | A1 * | 3/2004 | Orii et al. | 345/87 |
| 2006/0279356 | A1 * | 12/2006 | An | 330/253 |
| 2008/0111628 | A1 | 5/2008 | Tsuchi | |
| 2008/0225061 | A1 * | 9/2008 | Kimura et al. | 345/690 |

FOREIGN PATENT DOCUMENTS

| | | |
|---|---|---|
| TW | 200737090 | 10/2007 |
| TW | 200816146 | 4/2008 |

* cited by examiner

*Primary Examiner* — Alexander Eisen
*Assistant Examiner* — Patrick F Marinelli
(74) *Attorney, Agent, or Firm* — Winston Hsu; Scott Margo

(57) ABSTRACT

A display includes a panel, a timing controller, and a source driver. A method for driving the display includes the steps of sending a transfer signal asserted for a first period to the source driver initially at a line period; sending a driving control signal asserted for an asserted period to the source driver by the timing controller initially at a line period, utilizing a large driving capability of the source driver to drive the panel during the asserted period within the line period, and utilizing a small driving capability of the source driver to drive the panel beyond the asserted period within the line period.

13 Claims, 5 Drawing Sheets

METHOD FOR DRIVING A DISPLAY AND RELATED DISPLAY APPARATUS

BACKGROUND OF THE INVENTION

1. Field of the Invention

The present invention relates to a method for controlling the driving capability of an amplifier, and more particularly, to a method for controlling the driving capability of a source driver of an LCD device.

2. Description of the Prior Art

Liquid crystal display (LCD) devices are flat panel displays characterized by their thin appearance, low radiation and low power consumption. LCD devices have gradually replaced traditional cathode ray tube (CRT) displays, and have been widely applied in various electronic products such as notebook computers, personal digital assistants (PDAs), flat panel televisions, or mobile phones.

As shown in FIG. 1, the LCD device 100 includes a PCB board 110, a timing controller 120, a source driver 140, a gate driver 160, and a plurality of pixels 180 arranged in an array. When the LCD device 100 has larger panel size, has higher resolution, or operates at a higher frame rate, the driving capability of its source driver for charging the pixels has to be enhanced.

Hence, improving the driving capability of the source driver 120 and reducing power consumption have become considerations for the future.

SUMMARY OF THE INVENTION

It is one of the objectives of the claimed invention to provide a method for controlling the driving capability of a display, and a related display apparatus to solve the above-mentioned problems.

According to one embodiment, a method is provided for driving a display. The display includes a panel, a timing controller, and a source driver. The method includes the steps of sending a transfer signal asserted for a first period to the source driver initially at a line period; sending a driving control signal asserted for an asserted period to the source driver by the timing controller initially at the line period; utilizing a large driving capability of the source driver to drive the panel during the asserted period within the line period; and utilizing a small driving capability of the source driver to drive the panel beyond the asserted period within the line period.

According to one embodiment, a display apparatus is provided. The display apparatus includes a panel, a source driver, and a timing controller. The timing controller is used for sending a transfer signal asserted for a first period to the source driver initially at a line period, and for sending a driving control signal asserted for an asserted period initially at the line period to the source driver. The source driver utilizes a large driving capability to drive the panel during the asserted period within the line period, and then utilizes a small driving capability to drive the panel beyond the asserted period within the line period.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ". The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
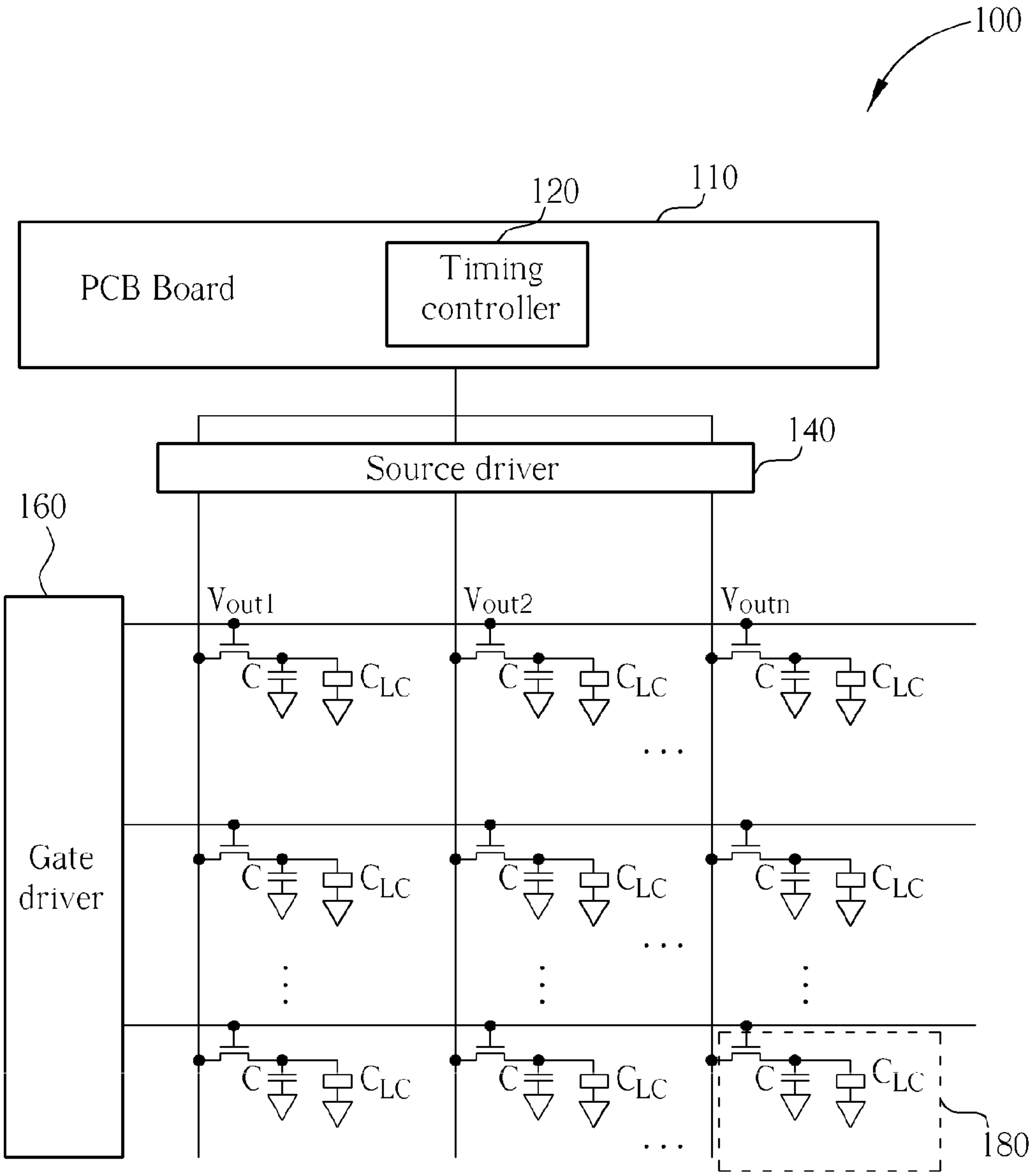
FIG. 1 PRIOR ART
FIG. 1 is a simplified diagram of a traditional architecture of an LCD device according to the prior art.
Figure 2:
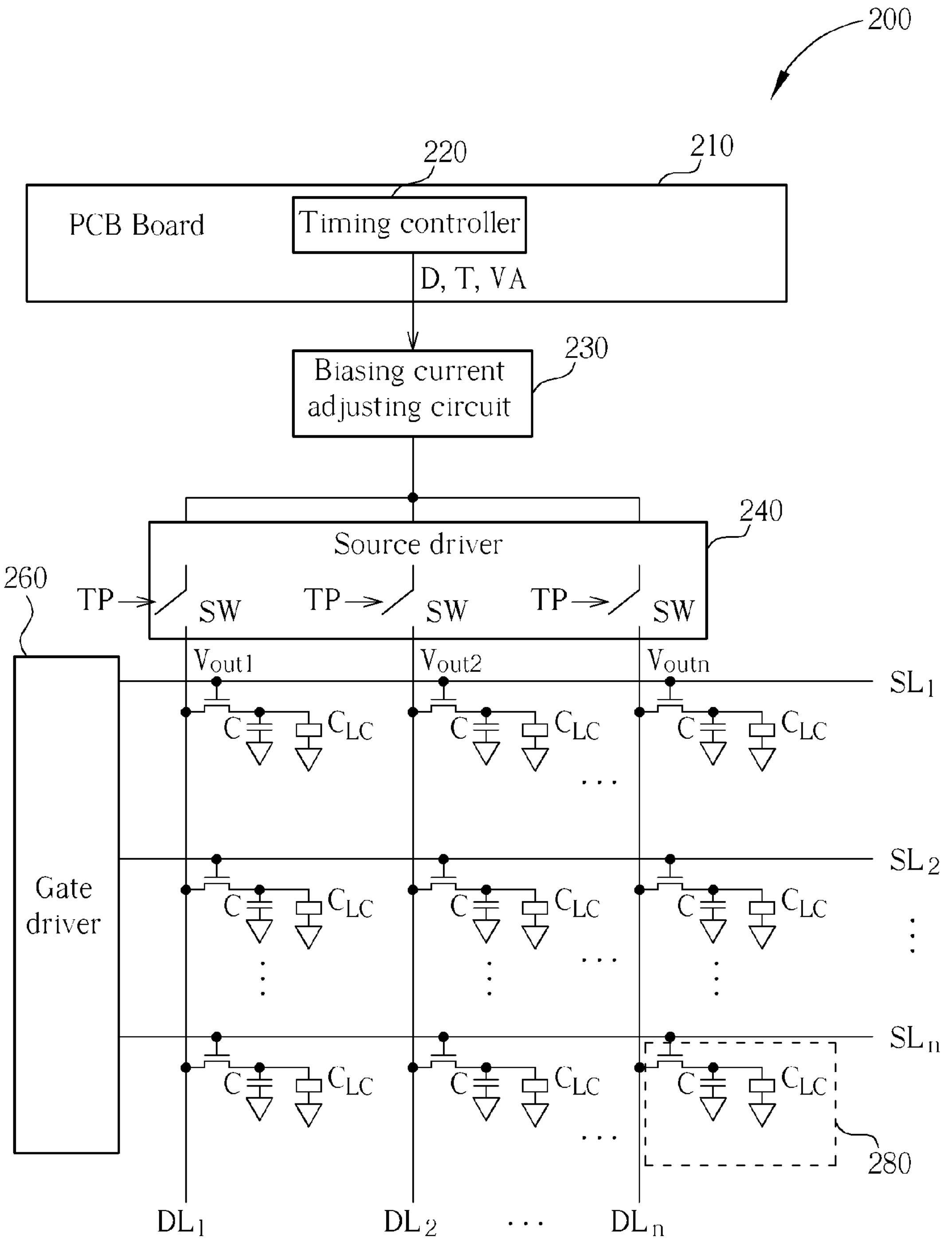
FIG. 2 is a diagram of an architecture of a display apparatus according to an embodiment of the present invention.

FIG. 2 is a diagram of an architecture of a display apparatus 200 according to an embodiment of the present invention. In this embodiment, the apparatus 200 is an LCD device, but this should not be considered as a limitation of the present invention. The display apparatus 200 includes, but is not limited to, a PCB board 210, a timing controller 220, a biasing current adjusting circuit 230, a source driver 240, a gate driver 260, a plurality of output switches SW, and a plurality of pixels 280 arranged in an array, wherein the timing controller 220 and the biasing current adjusting circuit 230 are disposed on the PCB board 210. The source driver 240 and the gate driver 260 are positioned on different sides of the array for respectively controlling data lines $DL_1$-$DL_n$ and scan lines $SL_1$-$SL_n$ of the display apparatus 200.

The timing controller 220 is used for outputting data signals D and display timings T to the source driver 240 and the gate driver 260. The timing controller 220 further outputs a driving control signal VA for selectively controlling the driving capability of the source driver 240. The driving control signal VA may be embedded in the display timings T or be an independent signal.

Figure 3:
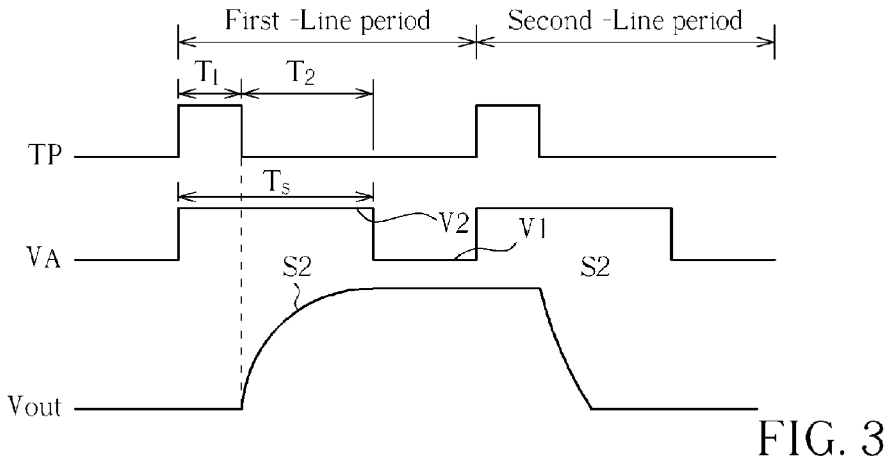
FIG. 3 is a timing diagram showing a timing sequence of the display apparatus shown in FIG. 2 according to a first embodiment of the present invention.

FIG. 3 is a timing diagram showing a timing sequence of the display apparatus 200 shown in FIG. 2 according to a first embodiment of the present invention. A symbol TP represents a transfer signal for controlling the source driver 240 to drive the pixels 280 via the output switches SW. During a first line period, the source driver 240 drives pixels on one horizontal line of the panel. The transfer signal TP is asserted, i.e., at a first period $T_1$, initially at a first line period, and accordingly the output switches SW are turned off such that the source driver 240 is in a high-impedance state; when the transfer signal TP is unasserted after the first period $T_1$, the output switches SW are turned on for the source driver 240 to drive the corresponding pixels 280. In other words, the switches SW shown in FIG. 2 are turned off during the first period $T_1$ and are turned on thereafter according to the transfer signal TP.

In this first embodiment, the driving control signal VA is asserted during an asserted period $T_S$, which starts from the first period $T_1$ and lasts for the second period $T_2$ after the first period T1, and thus the source driver 240 utilizes a large driving capability during the asserted period Ts to quickly change the voltage level of the output voltages of data lines $DL_1$-$DL_n$, and one voltage Vout of one data line is shown in curve S2 as an example. After the asserted period Ts, the source driver 240 utilizes a small driving capability to maintain the voltage level of the output voltage Vout for power saving, until the end of the first line period. At a second line period, the source driver 240 drives pixels on another horizontal line.

Figure 4:
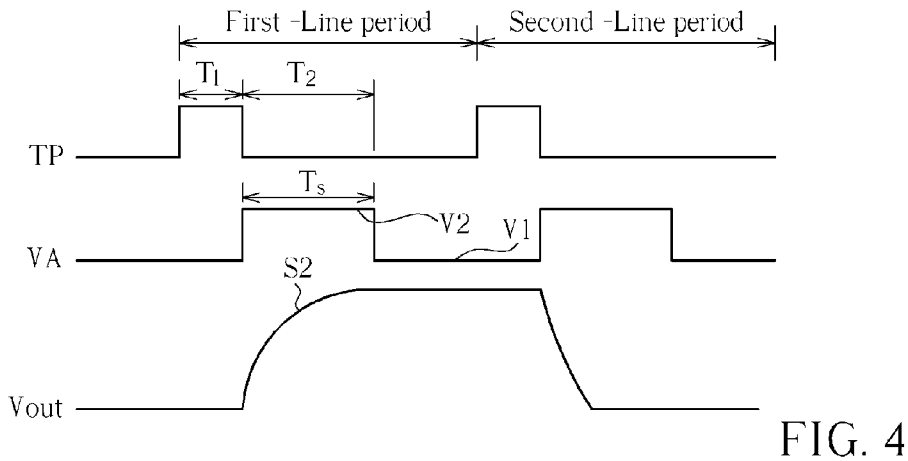
FIG. 4 is a timing diagram showing a timing sequence of the display apparatus shown in FIG. 2 according to a second embodiment of the present invention.

FIG. 4 is a timing diagram showing a timing sequence of the display apparatus 200 shown in FIG. 2 according to a second embodiment of the present invention. The timings shown in FIG. 4 are similar to those in FIG. 3, except the asserted period Ts of the driving control signal VA. The driving control signal VA is asserted during the asserted period Ts, which starts after the first period $T_1$ and lasts for the second period $T_2$. Therefore, the source driver 240 utilizes the large driving capability after the output switches SW are turned on during the asserted period $T_S$. After the asserted period Ts, the source driver 240 utilizes a small driving capability to maintain the voltage level of the output voltage Vout for power saving.

Figure 5:
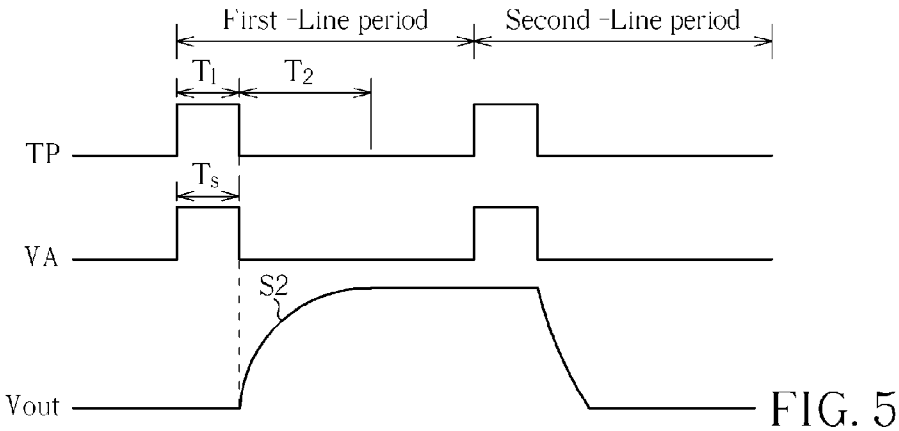
FIG. 5 is a timing diagram showing a timing sequence of the display apparatus shown in FIG. 2 according to a third embodiment of the present invention.

FIG. 5 is a timing diagram showing a timing sequence of the display apparatus 200 shown in FIG. 2 according to a third embodiment of the present invention. The timings shown in FIG. 5 are similar to those in FIG. 3, except the asserted period Ts of the driving control signal VA. The driving control signal VA is asserted during the asserted period Ts, which starts and ends in the first period $T_1$, while the output switches SW are turned off. Therefore, the source driver 240 utilizes the large driving capability during the first period $T_1$ while the output switches SW are turned off.

Of course, the abovementioned embodiments are merely examples for illustrating features of the present invention and should not be seen as limitations of the present invention. Those skilled in the art should appreciate that various modifications of the asserted period $T_S$ may be made. For example, the asserted period $T_S$ can be set to be smaller than the first period $T_1$ or the second period $T_2$ (i.e., $T_S<T_1$ or $T_S<T_2$), and this should also belong to the scope of the present invention.

Figure 6:
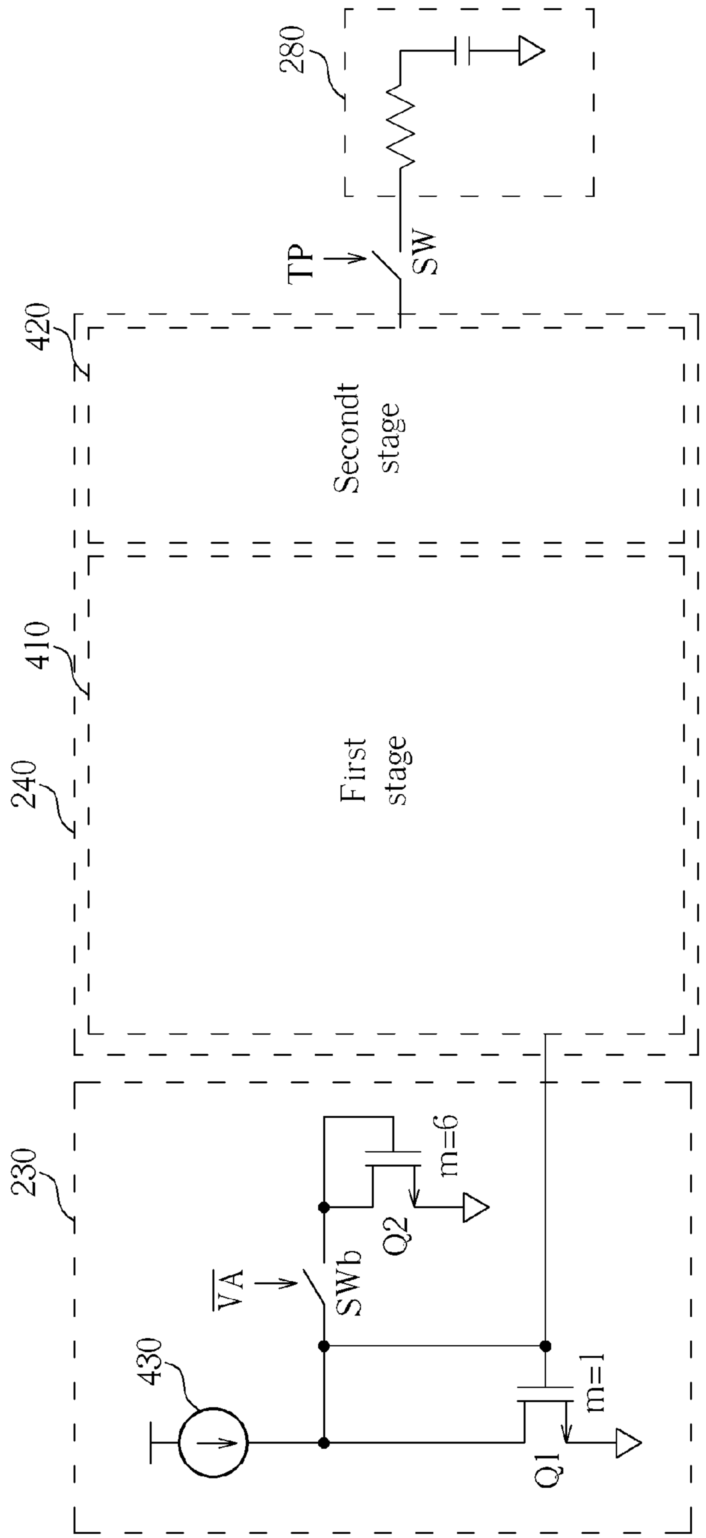
FIG. 6 is a diagram showing an example for controlling the driving capability of the source driver by adjusting the bias current of the output buffer of the source driver.

There are many ways to control the driving capability of the source driver 240. FIG. 6 is a diagram showing an example for controlling the driving capability of the source driver 240 by adjusting the bias current of the output buffer of the source driver 240. The source driver 240 includes an output buffer, which includes a first stage 410 and a second stage 420. The biasing current adjusting circuit 230 may be implemented in the source driver 240, in the timing controller 220, or be a separate part. The biasing current adjusting circuit 230 is used to provide different bias current to the output buffer of the source driver 240, based on the driving control signal VA. The source driver 240 therefore has the large driving capability if the bias current is large, and has the small driving capability if the bias current is small. In other words, the first stage 410 is utilized to amplify the differential input IN1 and IN2 respectively received by transistors Q6 and Q7, based on the biasing current from the biasing current adjusting circuit 230. The gain of the differential input IN1 and IN2 can be adjusted based on the biasing current, to provide large or small driving capability.

The embodiment above is presented merely for describing features of the present invention, and should not be considered to be limitations of the scope of the present invention. Certainly, people skilled in the art will readily appreciate that other designs of implementing the biasing current adjusting circuit 230 and the source driver 240 of the display apparatus 200 are feasible.

Please note that, although the above-mentioned biasing current adjusting circuit 230 is composed of the N-channel metal oxide semiconductor transistor, the N-channel metal oxide semiconductor transistor is merely an example utilized in the present embodiment of the present invention. For example, the biasing current adjusting circuit 230 in the present invention is not limited to the N-channel metal oxide semiconductor transistor. In fact, in another exemplary embodiment, the bias current adjusting circuit 230 can be composed of another device: for example, bipolar junction transistors, and the effect and function is the same. Additionally, since the practical circuit structure and operation of the biasing current adjusting circuit 230 and the current mirror architecture is considered well known in the pertinent art, a detailed description is omitted here for the sake of brevity.

Figure 7:
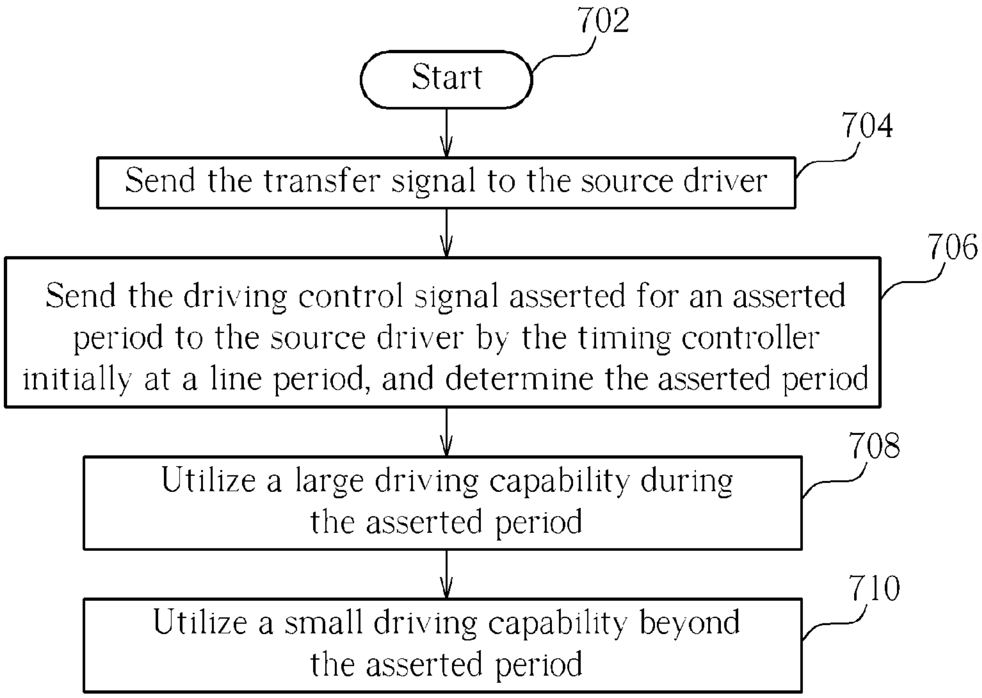
FIG. 7 is flowchart illustrating a method for driving a display according to an exemplary embodiment of the present invention.

FIG. 7 is a flowchart illustrating a method for driving a display according to an exemplary embodiment of the present invention. Please note that the following steps are not limited to be performed according to the exact sequence shown in FIG. 7 if a roughly identical result can be obtained.

In the following description, the components shown in FIG. 2 are collocated with the steps shown in FIG. 7 together with the timings shown in FIG. 3 for further detailed descriptions of operating manners. In Step 704, the transfer signal TP for the source driver 240 is sent. In Step 706, the driving control signal VA asserted for an asserted period $T_S$ is send to the source driver 240 by the timing controller 220 initially at a line period, and the asserted period $T_S$ is determined. In Step 708, the source driver 240 utilizes a large driving capability during the asserted period $T_S$, so as to quickly drive the panel. In Step 710, the source driver 240 utilizes a small driving capability beyond the asserted period $T_S$ so as to save power.

Please note that the asserted period $T_S$ is not a fixed value and can be adjusted depending on practical demands. For example, the timing controller 220 calculates the optimum power consumption to determine the asserted period $T_S$. Because the source driver 240 only uses the large driving capability during the asserted period $T_S$ and uses the small driving capability beyond the asserted period $T_S$, thus the driving capability of the source driver 240 can be improved without wasting extra power.

Note that the method shown in FIG. 7 is just a practicable embodiment, rather than limiting conditions of the present invention. Furthermore, the order of the steps merely represents a preferred embodiment of the method of the present invention. In other words, the illustrated order of steps can be changed based on the conditions, and is not limited to the above-mentioned order.

The abovementioned embodiments are presented merely for describing features of the present invention, and in no way should be considered to be limitations of the scope of the present invention. In summary, the present invention provides a method for controlling driving capability of a display and related display apparatus. Through controlling the driving control signal VA to boost the biasing current of the source driver 240 during the asserted period $T_S$, the driving capability of the source driver can be improved during the asserted period $T_S$. In addition, by controlling the driving control signal VA to maintain the bias current of the source driver 240 to be small, extra power consumption can be avoided. The timing controller 220 can be used for determining the asserted period $T_S$ to achieve the optimum power consumption.

Those skilled in the art will readily observe that numerous modifications and alterations of the device and method may be made while retaining the teachings of the invention.

What is claimed is:

1. A method for driving a display, the display having a panel, a timing controller and a source driver, the method comprising:

sending a transfer signal, asserted for a first period, to the source driver initially at a line period, such that the transfer signal has a high logic value during the first period;

sending a driving control signal, asserted for an asserted period, to the source driver by the timing controller initially at the line period, such that the driving control signal has the high logic value during the asserted period;

utilizing a large driving capability of the source driver to drive the panel during the asserted period within the line period in which a large bias current is supplied; and utilizing a small driving capability of the source driver to drive the panel beyond the asserted period within the line period in which a small bias current, that is smaller than the large bias current, is supplied, and the transfer signal and the driving control signal each have a low logic value;

wherein a start timing of the first period is the same as a start timing of the asserted period, and an end timing of the first period is the same as an end timing of the asserted period.

2. The method of claim 1, wherein the display further comprises an output switch connected between the source driver and the panel, and the method further comprises:

turning off the output switch during the first period and turning on the output switch after the first period.

3. The method of claim 1, wherein a second asserted period starts after the first period and lasts for a second period after the first period.

4. The method of claim 1, wherein the step of utilizing the large driving capability of the source driver comprises:

generating the large bias current to an output buffer of the source driver; and driving the panel by the output buffer.

5. The method of claim 1, wherein the step of utilizing the small driving capability of the source driver comprises:

generating the small bias current to a output buffer of the source driver; and driving the panel by the output buffer.

6. A display apparatus, comprising:

a panel;

a source driver, for driving the panel; and a timing controller, for sending a transfer signal asserted for a first period to the source driver initially at a line period, and for sending a driving control signal asserted for an asserted period initially at the line period to the source driver, such that the transfer signal has a high logic value during the first period and the driving control signal has the high logic value during the asserted period;

wherein the source driver utilizes a large driving capability to drive the panel during the asserted period within the line period in which a large bias current is supplied, and then utilizes a small driving capability to drive the panel beyond the asserted period within the line period in which a small bias current, that is smaller than the large bias current, is supplied, and the transfer signal and the driving control signal each have a low logic value;

wherein a start timing of the first period is the same as a start timing of the asserted period, and an end timing of the first period is the same as an end timing of the asserted period.

7. The display apparatus of claim 6, being an LCD device.

8. A display apparatus, of claim 6, further comprising:

an output switch, coupled between the source driver and the panel;

wherein the output switch is turned off during the first period and is turned on after the first period.

9. The display apparatus of claim 6, wherein a second asserted period starts after the first period and lasts for a second period after the first period.

10. The display apparatus of claim 6, wherein the source driver further comprises:

an output buffer, for driving the panel; and the display apparatus further comprises:

a bias current adjusting circuit, for generating the large bias current to the output buffer of the source driver.

11. The display apparatus of claim 6, wherein the source driver further comprises:

an output buffer, for driving the panel; and the display apparatus further comprises:

a bias current adjusting circuit, for generating the small bias current to the output buffer of the source driver.

12. A method for driving a display, the display having a panel, a timing controller and a source driver, the method comprising:

sending a transfer signal, asserted for a first period, to the source driver initially at a line period, such that the transfer signal has a high logic value during the first period;

sending a driving control signal, asserted for an asserted period, to the source driver by the timing controller initially at the line period, such that the driving control signal has the high logic value during the asserted period;

utilizing a large driving capability of the source driver to drive the panel during the asserted period within the line period in which a large bias current is supplied; and utilizing a small driving capability of the source driver to drive the panel beyond the asserted period within the line period in which a small bias current, that is smaller than the large bias current, is supplied, and the transfer signal and the driving control signal each have a low logic value;

wherein a starting timing of the asserted period equals to a starting timing of the first period, and an ending timing of the asserted period is after an ending timing of the first period for a time interval.

13. A display apparatus, comprising:

a panel;

a source driver, for driving the panel; and a timing controller, for sending a transfer signal asserted for a first period to the source driver initially at a line period, and for sending a driving control signal asserted for an asserted period initially at the line period to the source driver, such that the transfer signal has a high logic value during the first period and the driving control signal has the high logic value during the asserted period;

wherein the source driver utilizes a large driving capability to drive the panel during the asserted period within the line period in which the large bias current is supplied, and then utilizes a small driving capability to drive the panel beyond the asserted period within the line period in which the small bias current, that is smaller than the large bias current, is supplied, and the transfer signal and the driving control signal each have a low logic value;

wherein a starting timing of the asserted period equals to a starting timing of the first period, and an ending timing of the asserted period is after an ending timing of the first period for a time interval.

* * * * *